United States Patent [19]

Sakakiyama

[11] 4,449,620

[45] May 22, 1984

[54] ELECTROMAGNETIC CLUTCH CONTROL SYSTEM FOR VEHICLES

[75] Inventor: Ryuzo Sakakiyama, Tokyo, Japan

[73] Assignee: Fuji Jukogyo Kabushiki Kaisha, Tokyo, Japan

[21] Appl. No.: 323,800

[22] Filed: Nov. 23, 1981

[30] Foreign Application Priority Data

Nov. 28, 1980 [JP] Japan .................. 55-168414

[51] Int. Cl.$^3$ .............................................. B60K 41/28
[52] U.S. Cl. ............................. 192/0.052; 192/0.076; 192/3.58; 192/0.092
[58] Field of Search .............. 192/0.076, 0.033, 0.052, 192/3.56, 3.58, 0.07, 0.075, 0.08; 74/866

[56] References Cited

U.S. PATENT DOCUMENTS

| | | | | |
|---|---|---|---|---|
| 2,592,576 | 4/1952 | Kelbel | .............................. | 192/0.052 |
| 2,990,927 | 7/1961 | Steadman | ........................ | 192/0.052 |
| 4,091,902 | 5/1978 | Hamada | ............................ | 192/0.044 |

Primary Examiner—George H. Krizmanich
Assistant Examiner—M. Manley
Attorney, Agent, or Firm—Martin A. Farber

[57] ABSTRACT

A system for controlling an electromagnetic clutch of an internal combustion engine mounted on a vehicle, which has a magnetizing coil and a transmission. A vehicle speed detecting circuit is provided for producing an output when the vehicle speed exceeds a predetermined speed and another detecting circuit for a vehicle travelling condition is provided for producing an output by signals from a top-gear switch provided in the transmission and from an engine speed switch. A trouble detecting circuit is provided for producing a trouble signal when the output of the speed detecting circuit is not applied in spite of the output of the vehicle travelling condition detecting circuit. A gate device is responsive to the trouble signal for producing an output which is applied to a switching transistor. The transistor is turned on by the output, so that clutch current passes through the magnetizing coil for engaging the circuit.

3 Claims, 4 Drawing Figures

ELECTROMAGNETIC CLUTCH CONTROL SYSTEM FOR VEHICLES

BACKGROUND OF THE INVENTION

The present invention relates to a system for controlling an electromagnetic clutch for vehicles, and more particularly to a system for an electromagnetic powder clutch of the type in which clutch current is controlled in dependency on the vehicle speed detected by a speed detecting means.

An electromagnetic powder clutch as a type of electromagnetic clutch comprises an annular drive member secured to the crankshaft of an engine, a driven member installed on an input shaft of a transmission spaced from and leaving a small gap from the drive member, and a magnetizing coil provided in one of the members. A shift lever changes gears in the transmission. The shift lever is provided with a switch for the magnetizing coil, which is actuated by operating the shift lever. As the accelerator pedal of the vehicle is depressed, the current applied to the coil increases. The magnetic powder is aggregated in the gap between the drive member and the driven member, bring about a connection between the drive member and the driven member. The clutch current passing through the magnetizing coil is progressively increased depending on how far the accelerator pedal is depressed, while the clutch slips between the drive member and the driven member and gradually engages when the clutch current reaches a rated current. Thus, the vehicle may be started by depressing the accelerator pedal without operating a pedal switch.

In order to control driving of the vehicle, it is necessary to detect the speed of the vehicle and to control the clutch current according to the speed. In a system to meet such a requirement, a speed sensor is provided to generate a signal when the vehicle speed exceeds a predetermined value. The system is designed such that the clutch slips so as to provide semi engagement of the clutch during low speed below the predetermined speed and the clutch engages perfectly when the vehicle speed reaches the predetermined speed. When the vehicle speed decreases to a predetermined low value, the clutch is disengaged for preventing stopping of the engine. Generally, the speed sensor is provided in a speedometer. In systems employing such a speed sensor, there is the disadvantage that, if the speedometer cable is broken, the speed sensor does not work. Therefore, if the speed sensor does not work in a deceleration condition, the circuit of the clutch coil is interrupted so that the clutch disengages. As a result, the braking action of the engine does not occur.

SUMMARY OF THE INVENTION

It is, therefore, a general object of the present invention to provide an electromagnetic clutch control system in which an electromagnetic clutch is held in engagement regardless of the vehicle speed when the speed sensor is out of order so as to keep the braking effect of the engine.

According to the present invention, there is provided a system for controlling an electromagnetic clutch for an engine powered vehicle, which has an accelerator pedal, ignition device for the engine, a vehicle speed sensor, a transmission having multi-stage change gears, a shift lever for operating the transmission, a magnetizing coil for coupling the electromagnetic clutch, comprising an acceleration detecting circuit responsive to the depression of the accelerator pedal for producing an output signal, a vehicle speed detecting circuit responsive to the vehicle speed sensor for producing an output signal when the vehicle speed exceeds a predetermined speed, vehicle travelling detecting means for producing an output when the vehicle is driven at a high speed transmission ratio of the transmission, a trouble detecting circuit responsive to the output of the vehicle speed detecting circuit and to the output of the vehicle travelling detecting means and for producing a trouble output when the output of the vehicle speed detecting circuit is not applied under the condition of the presence of the output of the vehicle travelling detecting means, gate means responsive to the trouble output to produce a control signal, and switch means provided in the circuit of the magnetizng coil and responsive to the control signal for allowing the current to pass through the magnetizing coil.

The invention will be more readilly understood by way of example from the following description of control system for an electromagnetic clutch in accordance therewith, reference being made to the accompanying drawings.

DETAILED DESCRIPTION OF THE PREFERRED EMBODIMENTS

Figure 1:
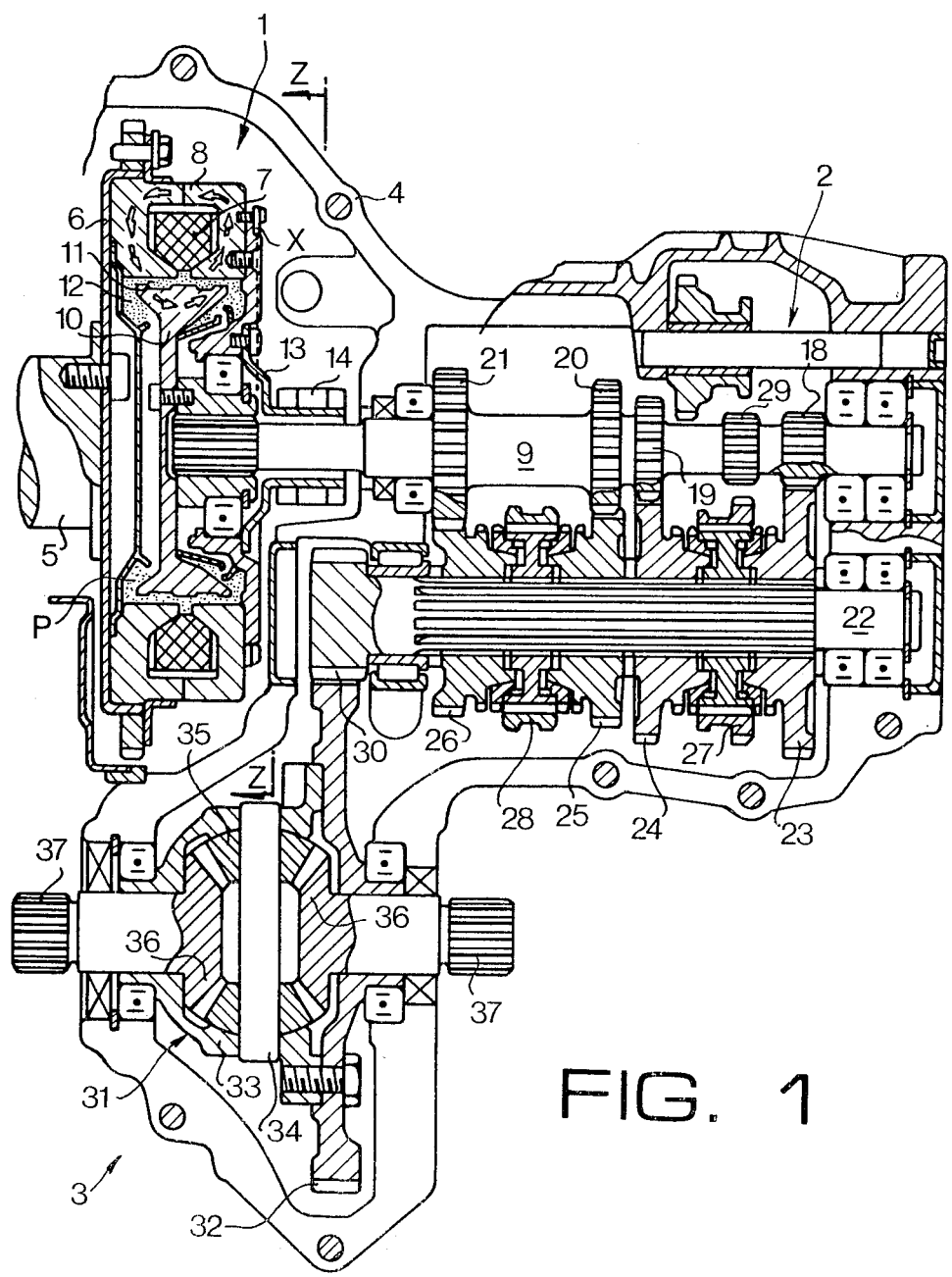
FIG. 1 is a cross-sectional view of an electromagnetic powder clutch controlled by a control system of the present invention.
Figure 2:
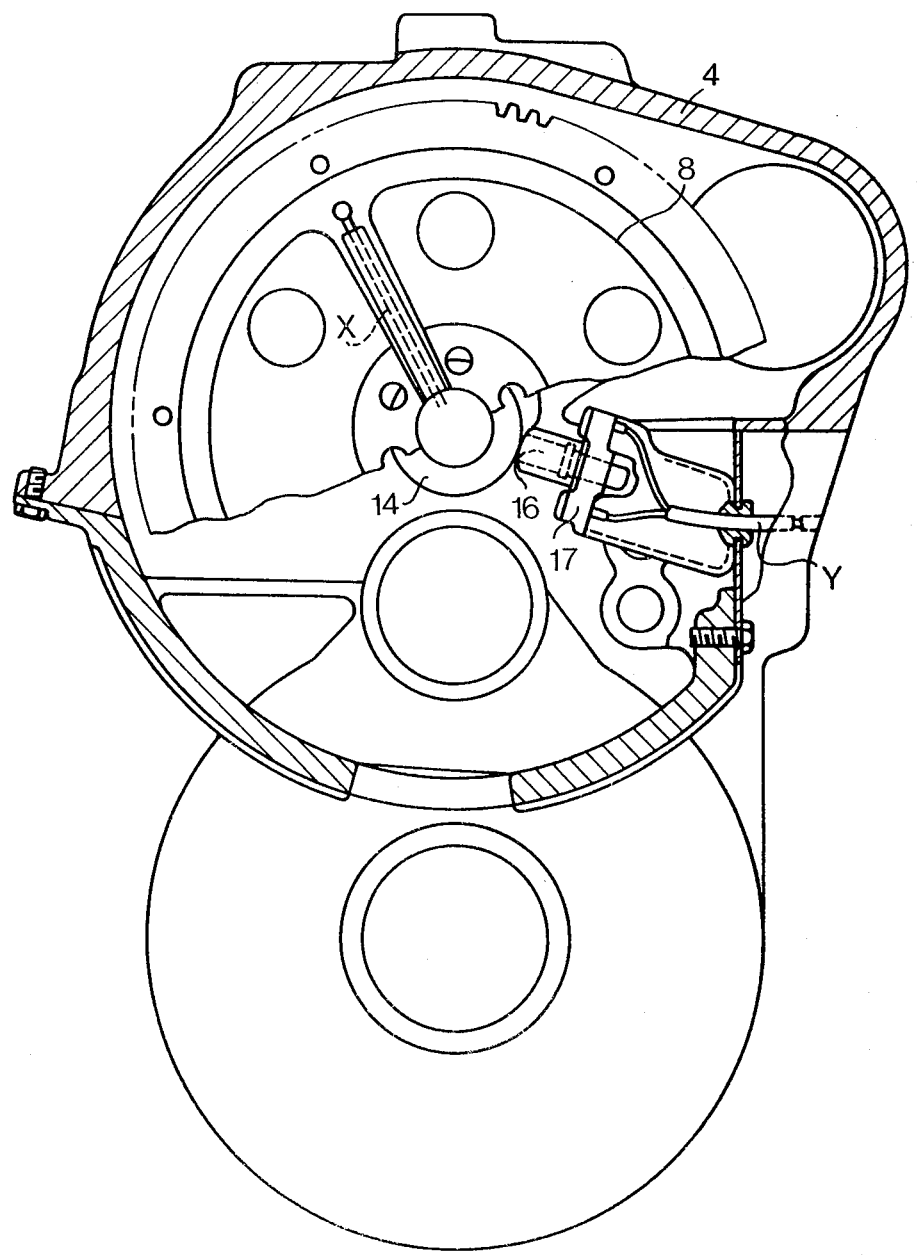
FIG. 2 is a cross-section taken along the line Z—Z of FIG. 1.

In FIGS. 1 and 2, an electromagnetic powder clutch 1, a four-speed transmission gear box 2 and a final reduction device 3 are provided.

The electromagnetic powder clutch 1 is located in a clutch case 4 and comprises a drive plate 6 attached to the end of a crankshaft 5 of an internal combustion engine (not shown), an annular drive member 8 secured to the drive plate 6, a magnetizing coil 7 provided in the drive member 8, and a driven member 10, which is secured by a spline engagement to an input shaft 9 of the transmission 2 and which is spaced from the drive member 8 defining a gap 11. Powder of magnetic material is provided in a powder chamber 12 so that the gap 11 can be filled with the powder. A cap 13 is secured to the drive member 8. The cap 13 has a cylindrical portion coaxial with the input shaft 9, on which slip rings 14 are secure. Slip rings 14 are connected to the drive member 8 by a lead X. Brushes 16 pressed against the slip rings 14 are supported in a holder 17 and connected to a hereinafter described control means by a lead Y.

In such construction, the drive plate 6 and the drive member 8 rotate together with the crankshaft 5, and the magnetic powder which is sealed in the powder chamber 12 is forced against the inner surface of the drive member 8 by centrifugal force. If the magnetizing coil 7 is excited by the current applied through the lead Y, the brushes 16, the slip rings 14 and the lead X, the drive member 8 is magnetized producing a magnetic flux passing through the driven member 10 as shown by arrows in FIG. 1. Thus, the magnetic flux causes the powder to cohere in the gap 11, so that the power of the engine is transmitted to the input shaft 9 through the clutch.

In the transmission 2, 1st to 4th speed drive gears 18 to 21 are integrally provided on the input shaft 9. The drive gears 18 to 21 are engaged with driven gears 23 to 26, selectively. Driven gears 23 to 26 are rotatably mounted on the output shaft 22 parallel to the input shaft 9. Each of the driven gears 23 and 24 is adapted to be engaged with the output shaft 22 by operating a synchromesh mechanism 27 and each of the driven gears 25 and 26 is engaged with the output shaft 22 by a synchromesh mechanism 28 in a well known manner. Further, a reverse driven gear means 29 is provided. Thus, by operating the shift lever S FIG. 3 of the transmission, the driven gear 23 may be coupled to the output shaft 22 by the synchromesh mechanism 27 and the 1st speed is obtained on the output shaft 22 because the power of output shaft 9 is greatly decreased; the 2nd, 3rd and 4th speeds, or gear ratios may be similarly obtained.

Further provided on an end of the output shaft 22 is an output gear 30 which engages with a ring gear 32 of a differential 31 of the final reduction device 3. The output of the output shaft 22 of the transmission 2 is transmitted directly from the ring gear 32 to a spur gear 36 through a case 33, a spider 34 and a pinion 35, and then to the driving wheels of the vehicle through wheel shafts 37.

Figure 3:
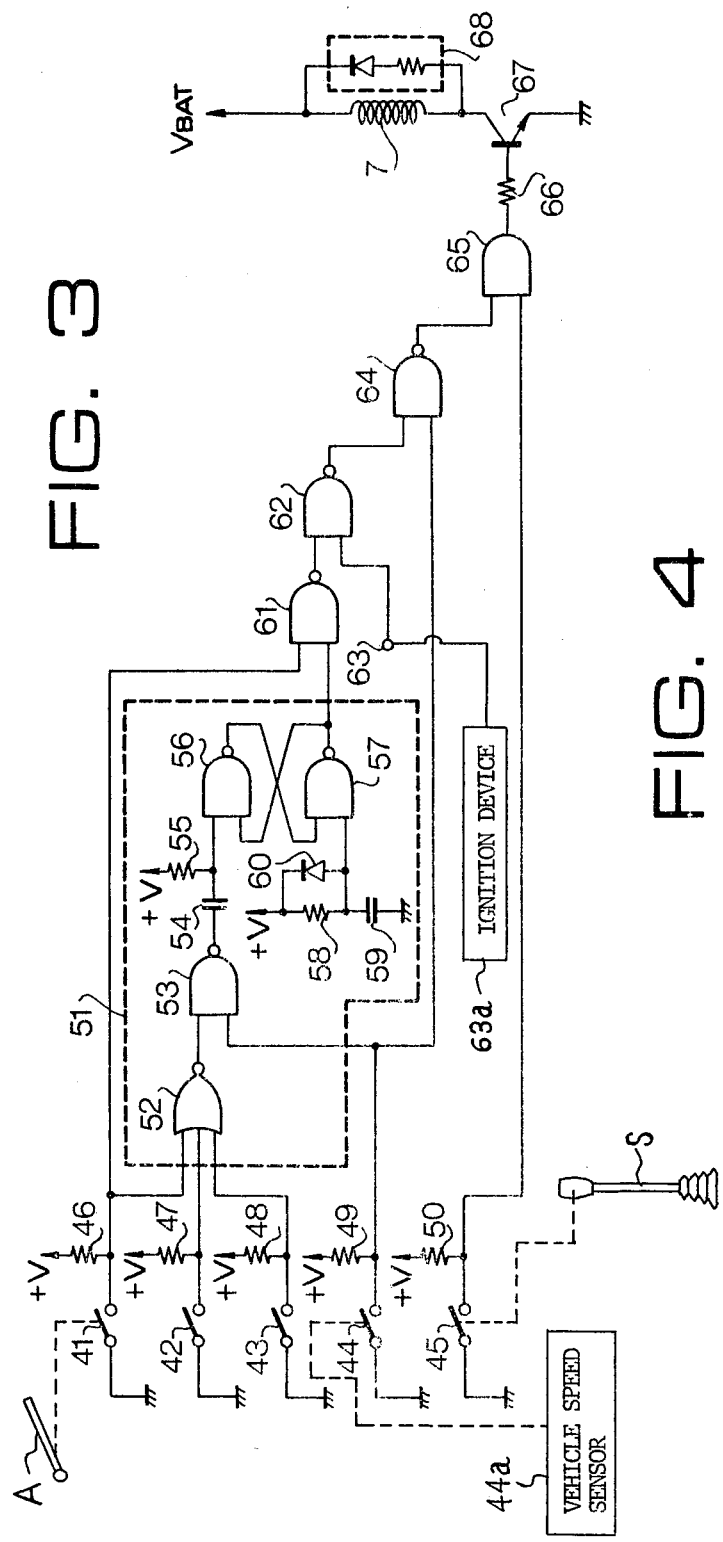
FIG. 3 is an electronic circuit of an embodiment according to the present invention.

In the control circuit of FIG. 3, the control system is connected with an acceleration switch 41, a top-gear switch 42, an engine speed switch 43, a vehicle speed switch 44 which is connected to a vehicle speed sensor 44a, and a transmission switch 45. Input signals from these switches are judged by the control system to adjust the control electric current sent to the magnetizing coil 7 of the clutch 1. The acceleration switch 41 is turned on when an accelerator pedal A of the vehicle is depressed; the top-gear switch 42 is turned on in the top gear condition of the transmission; the engine speed switch 43 is turned on when the speed exceeds a predetermined engine speed; the vehicle speed switch 44 is turned on by the vehicle speed sensor 44a when the speed exceeds a predetermined vehicle speed, and the transmission switch 45 is provided on the shift levers for the transmission and turned on when the shift lever S is being operated. One end of each switch 41-45 is grounded, and another end is applied with a positive voltage through resistors 46-50, respectively. Further, the ends of the switches 41, 42, 43 are connected to a NOR gate 52, the output of which is connected to one input of a NAND gate 53 the other input of which is connected to the vehicle speed switch 44. The switches 42-43 together with the NOR gate 52 comprise a vehicle travelling detecting means. The output of the NAND gate 53 is connected to a NAND gate 56 through a differentiating circuit comprising a capacitor 54 and a resistor 55. The NAND gate 56 constitutes an RS flip-flop together with a NAND gate 57. The input of the NAND gate 57 is connected to a reset circuit containing a resistor 58, a capacitor 59 and a diode 60. The elements 52-60 comprise a trouble detecting circuit 51. The output of the NAND gate 57 (that is an inverted output of the RS flip-flop) is connected to one input of a NAND gate 61, the other input of which is connected to the acceleration switch 41. The output of the NAND gate 61 is connected to one input of a NAND gate 62, and the other input of the NAND gate 62 is applied with a control signal 63 (described hereinafter) which is from an igniton device 63a in the ignition pulse train of the engine. The output of the NAND gate 62 is connected to one input of a NAND gate 64, the other input of which is also connected to the vehicle speed switch 44. The output of the NAND gate 64 and the transmission switch 45 are connected to an AND gate 65, the output voltage of which is applied to a base of a transistor 67 through a resistor 66. An emitter of the transistor 67 is grounded, while a collector thereof is connected with the coil 7 which is connected at both ends to a commutation circuit 68 comprising a resistor and a diode.

The operation of the present embodiment will be explained.

The operation of the trouble detecting circuit 51 will be first explained.

Being applied with the positive voltage through resistors 46-48, the NOR gate 52 produces a high level output only when all the acceleration, top gear and engine speed switches 41, 42, 43 are turned on, that is, when the accelerator pedal is depressed (acceleration action condition of the vehiccle), the transmission is in the top gear condition, and the engine speed exceeds the predetermined value. If the vehicle speed switch 44 is on, the NAND gate 53 produces a high level output even if the output of the NOR gate 52 is at the high level. Therefore, the output of the NAND gate 57 produces a high level output. However, if the vehicle speed switch 44 is out of order and in an off condition while the other switches 41-43 are turned on, high level signals are applied to both inputs of the NAND gate 53 which produces a low level output which is differentiated by the capacitor 54 and resistor 55. Therefore, the RS flip-flop comprising the NAND gate 56, 57 is set by the negative going input from the differentiating circuit, so that the NAND gate 57 produces a low level output. The low level output means that the vehicle speed switch 44 has failed. The RS flip-flop is adapted to be reset when the electric source is on.

When the vehicle speed switch 44 is in working order

Figure 4:
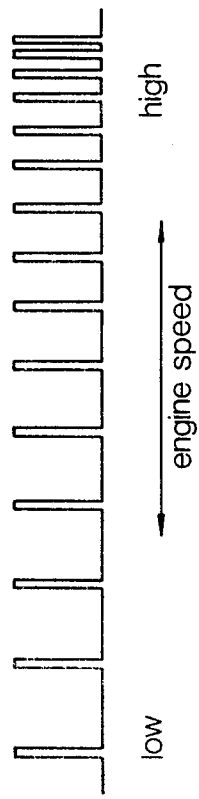
FIG. 4 is a graph illustrating the waveform of the control signal.

The NAND gate 57 produces a high level output whenever switch 44 is on or when switches 41-43 are not all on when switch 44 is off; the acceleration switch 41 is turned on upon starting the vehicle; the NAND gate 61 produces a high level signal; and the NAND gate 62 produces a signal which is an inverted signal of the control signal 63. The control signal 63 consists of pulses, the pulse separation of which corresponds to the ignition pulses of the engine and decreases with an increase of the engine speed. The control signal which is inverted by the NAND gate 62 is transmitted to the NAND gate 64. Since the vehicle speed switch 44 is off at a vehicle speed under a predetermined speed (e.g. 15 Km/h), the NAND gate 64 is applied with a high level voltage. Thus, the control signal is further inverted and transmitted to the AND gate 65 in the waveform shown in FIG. 4. In the driving condition of the vehicle, the transmission switch 45 is off and the AND gate 65 produces a high level output when the pulses from the NAND gate 64 are at a high level, causing the transistor 67 to turn on. Thus, an intermittent control current passes through the coil 7, so that the electromagnetic clutch provides a progressively increasing clutch torque in proportion to the engine speed. After a while, when the vehicle speed exceeds the predetermined value, the vehicle speed switch 44 is turned on, so that the NAND gate 64 produces a high level output continuously. Thus, the electromagnetic clutch 1 is entirely engaged.

When the shift lever is operated to select a gear ratio of the transmission, the transmission switch 45 is turned on and the AND gate 65 produces a low level signal. Accordingly, the transistor 67 is turned off to cut off the clutch current to disengage the clutch for allowing the change gear operation.

When the vehicle speed switch 44 is out of order

When the vehicle speed switch 44 is off and the other switches 41-43 are all on, as described above, the NAND gate 57 produces a low level output and the NAND gate 61 produces a high level output, regardless of an increase of vehicle speed by depressing the accelerator pedal. Therefore, the transistor 67 is intermittently turned on according to the control signal through the NAND gates 62, 64 and AND gate 65 to pass the control electric current through the coil 7. Consequently, clutch torque proportional to engine speed is provided, so that the braking action of the engine is effected a decelerating condition of the vehicle.

In accordance with the system of the present invention, the trouble detecting means detects a break-down of the vehicle speed detecting means and operates to keep the electromagnetic clutch in engagement, so that the braking action of the engine can occur while decelerating. Further, the system has an advantage that a brake-down of the vehicle speed detecting means may be recognized by the fact that the electromagnetic clutch does not entirely engage when the accelerator pedal is depressed, that is, the vehicle speed does not increase.

What is claimed is:

1. A system for controlling an electromagnetic clutch having a magnetizing coil for coupling said electromagnetic clutch of a vehicle powered by an engine having a transmission with a multi-stage change gears, said magnetizing coil being connected in a circuit to voltage, comprising
    acceleration detecting means for producing an output signal upon an acceleration action condition of said vehicle,
    vehicle speed detecting means for producing an output signal when vehicle speed exceeds a predetermined speed,
    vehicle travelling detecting means for producing an output signal when said vehicle is driven at a high speed transmission ratio of said transmission,
    a trouble detecting circuit comprising, first gate means responsive to said acceleration detecting means, said vehicle speed detecting means and said vehicle travelling detecting means, and a flip-flop operatively connected to said gate means so as to provide a trouble output signal when said output signal of said vehicle speed detecting means is not applied to said gate means when said output signals of said accelerating detecting means and of vehicle travelling detecting means occur,
    second gate means hving gates and being responsive to said trouble output signal, said vehicle speed detecting means, and said acceleration detecting means, said second gate means for producing a first output signal dependent on said trouble output signal, and, respectively, for producing a second output signal dependent on said output signal of said vehicle speed detecting means,
    switch means provided in the circuit of said magnetizing coil and responsive to the respective said output signals of said second gate means for allowing the current to pass through said magnetizing coil depending on the condition of said switch means,
    means for applying pulses to an input of one of the gates in said second gate means, and
    said second gate means for producing pulses as said first output signal in response to said trouble output signal, so that said magnetizing coil is intermittently energized so as to partially engage the clutch.

2. The system for controlling an electromagnetic clutch in accordance with claim 1 wherein
    said switch means is a transistor, which is turned completely on by said second output signal and intermittently on by said first output signal of said second gate means, respectively.

3. The system for controlling an electromagnetic clutch in accordance with claim 1, wherein
    said vehicle travelling detecting means comprises,
    a switch which is closed when the engine speed exceeds a predetermined engine speed, and
    a top-gear switch which is closed in a top-gear condition of said transmission, and
    said first gate means includes a gating means for producing an output in response to inputs from both said switches.

* * * * *